(12) United States Patent
Schnabl et al.

(10) Patent No.: US 9,875,484 B1
(45) Date of Patent: Jan. 23, 2018

(54) EVALUATING ATTRIBUTION MODELS (71) Applicant: Google Inc., Mountain View, CA (US)

(72) Inventors: Stefan F. Schnabl, San Francisco, CA (US); Jon Vaver, San Francisco, CA (US)

(73) Assignee: Google Inc., Mountain View, CA (US)

( * ) Notice: Subject to any disclaimer, the term of this patent is extended or adjusted under 35 U.S.C. 154(b) by 400 days.

(21) Appl. No.: 14/186,720

(22) Filed: Feb. 21, 2014

(51) Int. Cl.
*G06Q 30/00* (2012.01)
*G06Q 30/02* (2012.01)

(52) U.S. Cl.
CPC ............... *G06Q 30/0242* (2013.01)

(58) Field of Classification Search
CPC .................................. G06Q 30/0242
USPC ........................................ 705/14.41
See application file for complete search history.

(56) References Cited

U.S. PATENT DOCUMENTS

| | | | |
|---|---|---|---|
| 7,475,405 B2 * | 1/2009 | Manganaris ......... | G06F 21/552 706/45 |
| 7,747,465 B2 | 6/2010 | Srinivasan et al. | |
| 7,949,561 B2 * | 5/2011 | Briggs .................. | G06Q 30/02 705/14.41 |
| 2005/0021397 A1 | 1/2005 | Cui et al. | |
| 2005/0187823 A1 | 8/2005 | Howes | |
| 2006/0026061 A1 | 2/2006 | Collins | |
| 2006/0041480 A1 | 2/2006 | Briggs | |
| 2007/0027760 A1 * | 2/2007 | Collins ................. | G06Q 30/02 705/14.54 |
| 2008/0114639 A1 | 5/2008 | Meek et al. | |
| 2008/0114652 A1 | 5/2008 | Chang et al. | |
| 2008/0177847 A1 | 7/2008 | Wilson | |
| 2009/0063250 A1 | 3/2009 | Burgess et al. | |
| 2009/0106081 A1 | 4/2009 | Burgess et al. | |
| 2009/0171728 A1 | 7/2009 | Yan et al. | |
| 2010/0094682 A1 | 4/2010 | Symons et al. | |
| 2010/0121694 A1 | 5/2010 | Bharadwaj et al. | |

(Continued)

FOREIGN PATENT DOCUMENTS

WO     2011/143045     11/2011

OTHER PUBLICATIONS

Microsoft Computer Dictionary, Fifth Edition, 2002, Microsoft Press, p. 23.*

(Continued)

*Primary Examiner* — David Stoltenberg
*Assistant Examiner* — Michael Ezewoko
(74) *Attorney, Agent, or Firm* — Fish & Richardson P.C.

(57) ABSTRACT

Methods, systems, and apparatus including computer programs encoded on computer-readable storage media are provided for evaluating attribution models and comparing estimates produced by the attribution models with causal measurements from controlled experiments. An attribution model is identified for use in determining an estimate of an effectiveness of a campaign. An experiment is identified including experiment data that reflects implementation of a change in an experiment environment including identifying a measure of effectiveness of the change within a predetermined confidence level. The estimate is evaluated as compared to the identified measure of effectiveness. A determination is made that the attribution model is an effective measure of the change for the campaign, based at least in part on the evaluating.

20 Claims, 5 Drawing Sheets

(56) References Cited

U.S. PATENT DOCUMENTS

| | | |
|---|---|---|
| 2010/0250632 A1 | 9/2010 | Uno |
| 2011/0035272 A1 | 2/2011 | Bhatt et al. |
| 2011/0161407 A1 | 6/2011 | Juda et al. |
| 2011/0238490 A1 | 9/2011 | Simard et al. |
| 2011/0276392 A1* | 11/2011 | Vaver ............... G06Q 30/02 705/14.43 |
| 2011/0320262 A1* | 12/2011 | Symons ............. G06Q 10/04 705/14.42 |
| 2013/0132437 A1* | 5/2013 | Park ................. G06Q 30/02 707/780 |

OTHER PUBLICATIONS

Mind—A Brief Introduction, John R. Searle, 2004, Oxford University Press, pp. 62-67.*
What is Thought, Eric Baum, The MIT Press, 2004, pp. 33-65.*
Advanced Artificial Intelligence, Shi, World Scientific, 2011, pp. 430-458.*
Data Mining, Elsevier, Han and Kamber, 2006, pp. 234-274.*
PCT Notification of Transmittal of International Search Report and Written Opinion of the International Searching Authority for Corresponding International application No. PCT/US2011/35364, dated Sep. 1, 2011, 14 pages.
Box et al., Statistics for Experimenters, New York: John Wiley & Sons, Inc, 1978.
Lewis, Randall and Reiley, David, "Retail Advertising Works! Measuring the Effects of Advertising on Sales via a Controlled Experiment on Yahoo!" [online], 2008. Retrieved from the Internet: http://cess.nyu.edu/exp_seminar/fall_08_papers/Retail_Advertising_Works.doc, 30 pages.
Lucas, "Combined Shewhart-CUSUM Quality Control Schemes" Journal of Quality Technology vol. 14, No. 2, 1982, 51-59.
Sean's blog, "Measuring Offline Advertising Effectiveness (Advertising Elasticity)," [online], Jan. 21, 2009. Retrieved from the Internet: http://seanharper.net/2009/01/21/measuring-offline-advertising-effectiveness-advertising-elasticity/, 5 pages.
Google Case Study, "lastmiute.com's 12-week geo—experiment reveals a 43% uplift in Google AdWords values," 2012, 2 pages.
'Google' [online]. "Attribution Modeling," 2014 [retrieved on Feb. 3, 2014]. Retrieved from the internet: URL<https://support.google.com/analytics/answer/1662518?hl=en>, 3 pages.
'Google Analytics' [online]. "lastminute.com finds that traditional conversion tracking significantly undervalues non-brand search," Jan. 25, 2013 [retrieved on Dec. 18, 2013]. Retrieved from the Internet: URL<http://analytics.blogspot.com/2013/01/lastminutecom-finds-that-traditional.html>, 5 pages.
Kaushik [online], "Measuring Incrementality: Controlled Experiments to the Rescue!," Occam's Razor, 2013 [retrieved on Dec. 18, 2013]. Retrieved from the internet: URL<http://www.kaushik.net/avinash/controlled-experiments-measuring-incrementality/>, 18 pages.
Kaushik [online], "Multi-Channel Attribution Modeling: The Good, Bad and Ugly Models," Occam's Razxor, 2013 [retrieved on Dec. 18, 2013]. Retrieved from the internet: URL<http://www.kaushik.net/avinash/multi-channel-attribution-modeling-good-bad-ubgly-models/>, 34 pages.
Kaushik [online], "Multi-Channel Attribution: Definitions, Models and a Reality Check," Occam's Razor, 2013 [retrieved on Dec. 18, 2013]. Retrieved from the internet: URL<http://www.kaushik.net/avinash/multi-channel-attribution-definitions-models/>, 38 pages.
Montgomery et al., "Predicting Online Purchase Conversion Using Web Path Analysis", Nov. 2002, 53 pages.
Rutz et al., "A Model of Individual Keyword Performance in Paid Search Advertising", Jun. 2007, 45 pages.

* cited by examiner

| | Last Click | First Click | Data-Driven | Experiment |
|---|---|---|---|---|
| Spend | $10,000 | $10,000 | $10,000 | $10,000 |
| Revenue | $20,000 | $60,000 | $30,000 | $35,000 |
| ROAS | 2.0 | 6.0 | 3.0 | 3.5 (+/- 1) |

EVALUATING ATTRIBUTION MODELS

BACKGROUND

The present specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with the web page, for example, along with search results. Upon viewing such content, for example, a content consumer may perform various actions, such as interacting with (e.g., clicking) a content item, navigating to a content provider's (e.g., an advertiser's) web site, and/or purchasing a product or service from the content provider.

Attribution modeling can be used to attribute the actions of content consumers to content items to which the consumers have previously been exposed. In general, attribution models are correlational, and may include position and/or rules-based techniques for attribution. The estimated value (e.g., return on advertising spend) of a campaign (e.g., a marketing campaign) calculated using an attribution model may vary, depending on the type of attribution model used.

SUMMARY

In general, one innovative aspect of the subject matter described in this specification can be embodied in methods that include the actions of identifying an attribution model for use in determining an estimate of an effectiveness of a campaign, identifying an experiment including experiment data that reflects implementation of a change in an experiment environment, including identifying a measure of effectiveness of the change within a predetermined confidence level, evaluating the estimate as compared to the identified measure of effectiveness, and determining that the attribution model is an effective measure of the change for the campaign based at least in part on the evaluating. Other embodiments of this aspect can include corresponding systems, apparatus, and computer programs, configured to perform the actions of the methods, encoded on computer storage devices.

These and other implementations can each optionally include one or more of the following features. The change can be a change of spend associated with the campaign. The change can be a change in media type or mix of media types in the campaign. The campaign can be associated with an advertisement. The media types can include display, search, or video. Guidance can be provided to a campaign sponsor for selecting an attribution model from among a plurality of attribution models for the campaign. The attribution model can be first click, last click, data-driven, or another suitable attribution model. The attribution model can be provided as a suggestion to the content sponsor associated with the campaign. A change can be suggested to a previously selected attribution model used for the campaign. A plurality of attribution models can be identified. Evaluating the estimate can include comparing an estimate of effectiveness for each of the identified plurality of attribution models to the measure of effectiveness of the experiment. Determining that the attribution model is an effective measure can include determining the attribution model from among the plurality of attribution model as a model that indicates an estimate of effectiveness that is closest to the measure of effectiveness of the experiment. The attribution model can be used to determine a bid adjustment for the campaign. One or more different bids can be suggested to be associated with the campaign, based on the change and the effectiveness indicated by the attribution model. The attribution model can be used to generate reports on an effectiveness of the campaign. The experiment can be a geographic experiment that uses a control group in one geographic region that does not present content from the campaign as compared to other geographic areas where content from the campaign is presented. An incremental performance impact of the change can be evaluated using the attribution model. An evaluation of the attribution model can be presented to a content sponsor associated with the campaign. The confidence level can be associated with a band, and the estimate of the effectiveness of the attribution model can be within the band.

Advantageous implementations may include none, one or more of the following features. One or more attribution models can be evaluated by comparing the results of the models to a causal measurement from an experiment. Data for the attribution models can be collected while conducting the experiment. An attribution model that provides a result that is identified as being substantially similar to a result determined by the experiment can be used by a campaign sponsor for making future decisions regarding the campaign in lieu of conducting additional experiments. Suitable attribution models can be identified for determining the effectiveness of particular types of campaign changes. Suitable attribution models can be identified for determining the effectiveness of campaigns which include media types, or a mix of media types that are new to a campaign sponsor. Suitable attribution models can be identified for formulating long-term strategies for future campaigns, and for suggesting real-time adjustments to an ongoing campaign.

The details of one or more implementations are set forth in the accompanying drawings and the description below. Other potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

Attribution models can be used to attribute user actions, interactions, conversions (e.g., a click of a content item, a visit to a web site, a subscription to a mailing list, a following on a social networking site, a purchase of a product or service, etc.) or other activities to one or more content items to which the users have previously been exposed during a campaign. For example, the campaign (e.g., a marketing campaign) may include various content items (e.g., display advertisements, search advertisements, video advertisements, etc.) for presentation to users, and parameters (e.g., time, location, bid amount, etc.) for presenting the content items. In general, attribution models are correlational, and may be used to calculate an estimated value (e.g., return on advertising spend, cost per action, etc.) of the user actions performed during or in association with the campaign. The calculated value estimate may vary, however, depending on the type of attribution model used.

A controlled experiment (e.g., a geographic and/or panel-based experiment) can be conducted to perform a causal measurement of campaign value. When performed using one or more parameters reflecting an incremental change (e.g., a change in spending, a change in content item, a change in content item type, etc.) to a campaign, for example, the controlled experiment can be used to determine a measured value for the campaign, within a statistically valid confidence interval. The causal measurement of campaign value from the controlled experiment can be compared with one or more calculated value estimates produced by various attribution models, to determine an attribution model that most accurately estimates the causal impact of a particular type of change to the campaign. Comparison information can be presented to a campaign sponsor to provide guidance for selecting a suitable attribution model for use in identifying campaign performance.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether and/or how to receive content from the content management system that may be more relevant to the user. In addition, certain data may be anonymized in one or more ways before it is stored or used, so that personally identifiable information is removed when generating monetizable parameters (e.g., monetizable demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content management system.

Figure 1:
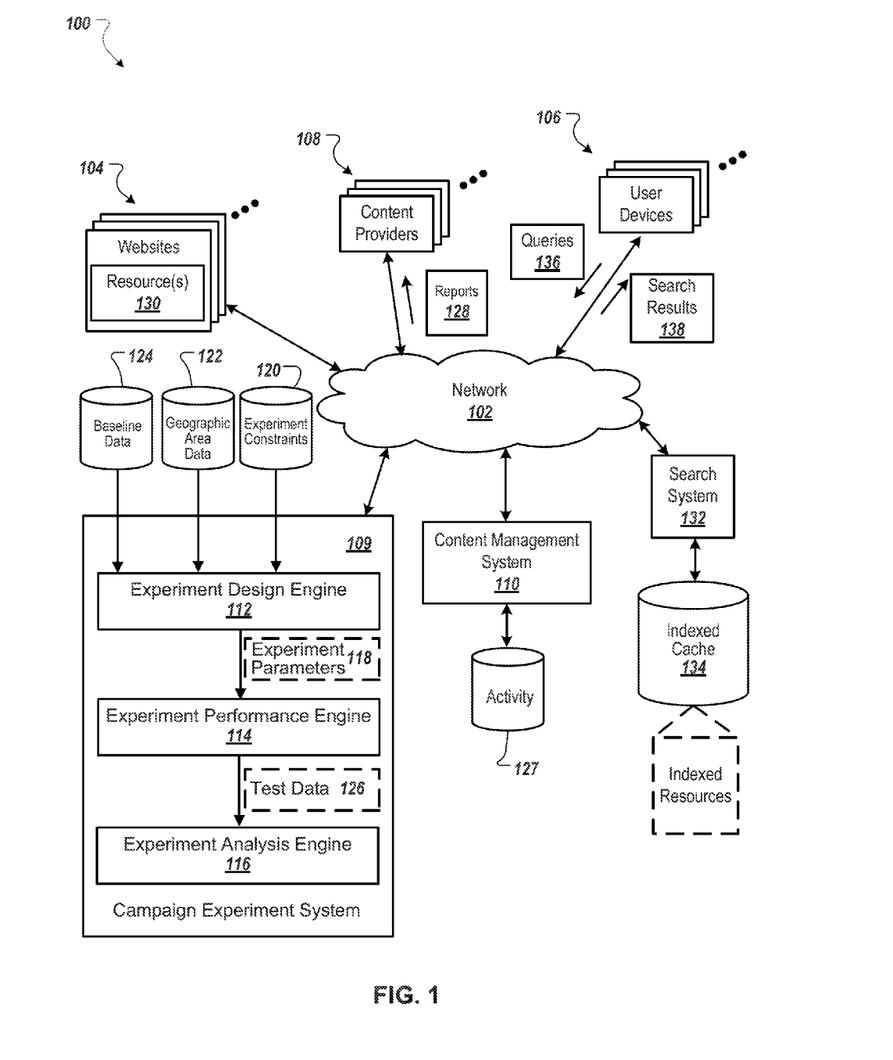
FIG. 1 is a block diagram of an example environment for presenting content to users in response to requests for content and for performing campaign experiments.

FIG. 1 is a block diagram of an example environment 100 for presenting content to users in response to requests for content and for performing campaign experiments. The example environment 100 includes a network 102, such as a local area network (LAN), a wide area network (WAN), the Internet, or a combination thereof. The network 102 connects websites 104, user devices 106, content providers 108, publishers, a campaign experiment system 109, and a content management system 110. The example environment 100 may include many thousands of websites 104, user devices 106, and content providers 108. The content providers 108 can be, for example, advertisers. Other types of content providers are possible.

The campaign experiment system 109 can be used to design and perform a series of content experiments and analyze the results of those content experiments. A content experiment tests a content campaign, for example, in one or more geographic areas. Each geographic area can be a discrete, non-overlapping, geographic area. The geographic areas can be defined using various heuristics; for example, in some implementations, each geographic area corresponds to a designated market area (DMA). In general, the content experiments are performed by monitoring subject behavior to determine what effect, if any, a change in campaign spend has on user behavior. For example, a return on campaign spend can be determined, which can estimate an incremental change in user behavior per campaign dollar spent.

The campaign experiment system 109 can perform a series of geographic experiments to measure, monitor, or optimize campaign effectiveness on an ongoing basis. Performing a series of ongoing experiments can result in less disruption in campaign spend as compared to running one or more isolated geographic experiments. Disruption in campaign spend can occur due to campaign spend changes that occur due to the running of an experiment. Performing a series of ongoing experiments can result in a more balanced distribution of campaign spend across geographic areas as compared to running one or more isolated geographic experiments. That is, with a series of geographic experiments, campaign spend can be generally equally distributed across geographic areas over time. A series of geographic experiments can provide multiple measurements which can be combined to provide a more definitive estimate of campaign effectiveness than an estimate of campaign effectiveness provided by a single geographic experiment.

The campaign experiment system 109 can be implemented as one or more software programs executing on one or more computers/servers. The campaign experiment system 109 includes an experiment design engine 112 that aids in design of a campaign experiment, an experiment performance engine 114 that aids in the performance of the campaign experiment, and an experiment analysis engine 116 that analyzes the data gathered during the campaign experiment. While the campaign experiment system 109 is illustrated as a single system in FIG. 1, the individual components of the campaign experiment system 109 can alternatively be divided among multiple systems.

The experiment design engine 112 selects and/or determines one or more experiment parameters 118 for the experiment. The experiment parameters 118 can include, for example, the length of a test period, an overall length of the experiment, which geographic areas are used in the experiment, a number of geo-groups to use in the experiment, a magnitude of campaign spend change, and/or criteria used to balance and order geographic areas before assigning geographic areas to geo-groups.

The experiment design engine 112 selects the parameters 118 according to one or more of experiment constraints 120, geographic area data 122, and baseline data 124. The experiment constraints 120 include one or more constraints that specify requirements for the experiment. Example constraints include a maximum acceptable variance in return on campaign spend estimates estimated by the experiment analysis engine 116, a maximum amount of money that can be spent during the experiment, or a maximum length of time for the experiment.

The geographic area data 122 specifies physical coordinates associated with geographic areas (e.g., physical coordinates of the boundaries of a geographic area or physical coordinates of the center of a geographic area). The geographic area data 122 can optionally include other descriptive details for the geographic areas, for example, the population of each geographic area, the volume of internet activity in each geographic area (e.g., a search volume or a volume of visits to particular web sites), and/or the number of businesses of a particular type that are located within each geographic area.

The baseline data 124 specifies, for each geographic region, a quantification of an action of interest taken by subjects in the geographic region during a particular period before the experiment begins. An action of interest is a user action hypothesized to be affected by viewing a content item. Example actions of interest include, for example, purchasing goods from physical stores, purchasing goods from online stores, purchasing goods from both online and physical stores, clicking on a link to a content provider's website, otherwise visiting a content provider's website, opening an account on a content provider's website, or requesting a quote from a content provider's website.

The experiment performance engine 114 receives the experiment parameters 118 and directs a series of experiments according to the parameters 118. For example, the experiment performance engine 114, either automatically and/or in combination with manual steps facilitated by an administrator, assigns each geographic area to a respective geo-group. At a beginning of a first test period, the experiment performance engine 114 adjusts campaign parameters/campaign spend for a first geo-group (or set of geo-groups) while keeping campaign parameters substantially constant across other geo-groups. The experiment performance engine 114 can adjust the campaign spend or can direct another system, such as the content management system 110, to adjust the campaign spend. At a beginning of a second subsequent test period, the experiment performance engine 114 changes the campaign parameters/campaign spend in the first geo-group (or first set of geo-groups) to a baseline level and adjusts the campaign parameters/campaign spend in a second, different geo-group (or set of geo-groups), while keeping campaign parameters substantially constant across other geo-groups. The experiment performance engine 114 cycles through the geo-groups (or sets of geo-groups) during one or more additional subsequent test periods, performing the returning, the changing, and the keeping of the campaign parameters on a different set of geo-groups in each cycle.

In some implementations, the experiment performance engine 114 conducts each step of the experiment. In some implementations, the experiment performance engine 114 provides some or all of the parameters 118 for use by a separate system, such as the content management system 110, that controls, for example, what content items are shown to what users. The experiment performance engine 114 collects test data 126 that specifies for each geo-group and each test period, a quantification of an action of interest taken by subjects in the geographic areas in the geo-group during the test period.

Both the baseline data 124 and the test data 126 can describe the behavior of users in a respective period (e.g., a pre-test period or a particular test period, respectively). For example, the experiment performance engine 114 can collect data describing one or more actions of interest, e.g., as represented by sales volume in offline stores, sales volume in online stores, total sales volume, or number of visits to a website associated with a content item. In some implementations, the experiment performance engine 114 gathers the baseline data 124 and the test data 126. In some implementations, the experiment performance engine 114 receives data from the content management system 110, such as data from an activity data store 127. In some implementations, the experiment performance engine 114 receives data from some other system. For example, sales data can be received from individual stores making sales, or from a company that tracks sales data across one or more of the stores.

The experiment performance engine 114 can provide the test data 126 to the experiment analysis engine 116. The experiment analysis engine 116 applies one or more models to measure campaign effectiveness across one or more test periods. The models can be, for example, a weighted linear regression model, or another suitable model for modeling the relationship between a dependent variable and one or more explanatory variables. The model can be based, for example, on the test data 126 and on the baseline data 124.

The experiment analysis engine 116 can report one or more results of the model(s). For example, a return on investment in the time period for the campaign, such as a return on campaign spend estimate, can be reported. A return on campaign spend is an estimated effect that a change in campaign spend will have on an action of interest. For example, the return on campaign spend estimate can correspond to an action of interest (e.g., the amount of revenue associated with user purchases or the number of visits to a website of interest) that are determined to be caused by the campaign, divided by the amount spent on the campaign.

In general, observations and analysis based on the model can be reported, such as in one or more reports 128 provided to content providers 108 (e.g., campaign sponsors). For example, in addition to or instead of reporting an estimate of campaign effectiveness based on experimental measurements, data from the activity data store 127 can be used with one or more attribution models (e.g., first click, last click, data-driven, etc.) to estimate campaign effectiveness based on correlational techniques. As described in more detail below, reporting can include determining and providing (e.g., to a campaign sponsor) one or more comparisons between campaign effectiveness as measured by an experiment, and campaign effectiveness as estimated by one or more attribution models.

The content management system 110 may be used for selecting and providing content in response to requests for content. Below is a description of the content management system 110 and related components in a context of online content presentation (e.g., online advertising). However, other types of content presentation can be used, such as presentation of content on television, radio, print, or billboards, to name a few examples.

A website 104 includes one or more resources 130 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 130 can be any data that can be provided over the network 102. A resource 130 can be identified by a resource address that is associated with the resource 130. Resources 130 include HTML pages, word processing documents, portable document format (PDF) documents, images, video, and news feed sources, to name only a few. The resources 130 can include content, such as words, phrases, videos, images and sounds, that may include embedded information (such as meta-information hyperlinks) and/or embedded instructions (such as scripts).

To facilitate searching of resources 130, the environment 100 can include a search system 132 that identifies the resources 130 by crawling and indexing the resources 130 provided by the content publishers on the websites 104. Data about the resources 130 can be indexed based on the resource 130 to which the data corresponds. The indexed and, optionally, cached copies of the resources 130 can be stored in an indexed cache 134.

A user device 106 is an electronic device that is under control of a user and is capable of requesting and receiving resources 130 over the network 102. Example user devices 106 include personal computers, tablet computers, mobile communication devices (e.g., smartphones), televisions, and other devices that can send and receive data over the network 102. A user device 106 typically includes one or more user applications, such as a web browser, to facilitate the sending and receiving of data over the network 102. The web browser can display various types of web applications, such as a map application.

A user device 106 can, for example, request resources 130 from a website 104. In turn, data representing the resource 130 can be provided to the user device 106 for presentation by the user device 106. As another example, user devices 106 can submit search queries 136 to the search system 113 over the network 102. In response to a search query 136, the search system 113 can access the indexed cache 134 to identify resources 130 that are relevant to the search query 136. The search system 113 identifies the resources 130 in the form of search results 138 and returns the search results 138 to the user devices 106 in one or more search results pages.

A request for content can be received by the content management system 110 from a user device 106. The request for content can be associated with, for example, a request for a resource 130 or a search query 136. The content management system 110 can select one or more additional content items to provide in response to the request. For example, the request for content can include characteristics (e.g., size, supported media types) of one or more content "slots" that are defined for the requested resource 130 or search results page. As another example, resource keywords associated with a requested resource 130 or a search query 136 can be provided to the content management system 110.

Content items selected by the content management system 110 can include content items having characteristics matching the characteristics of content slots and that are identified as relevant to specified resource keywords or search queries 136. For example, content items having keywords that match the resource keywords or the search query 136 can be selected by the content management system 110. The content management system 110 can also select content items at least in part based on the results of an auction. Data indicating user responses (e.g., click-throughs, conversions, etc.) to content items can be stored in the activity data store 127.

Figure 2:
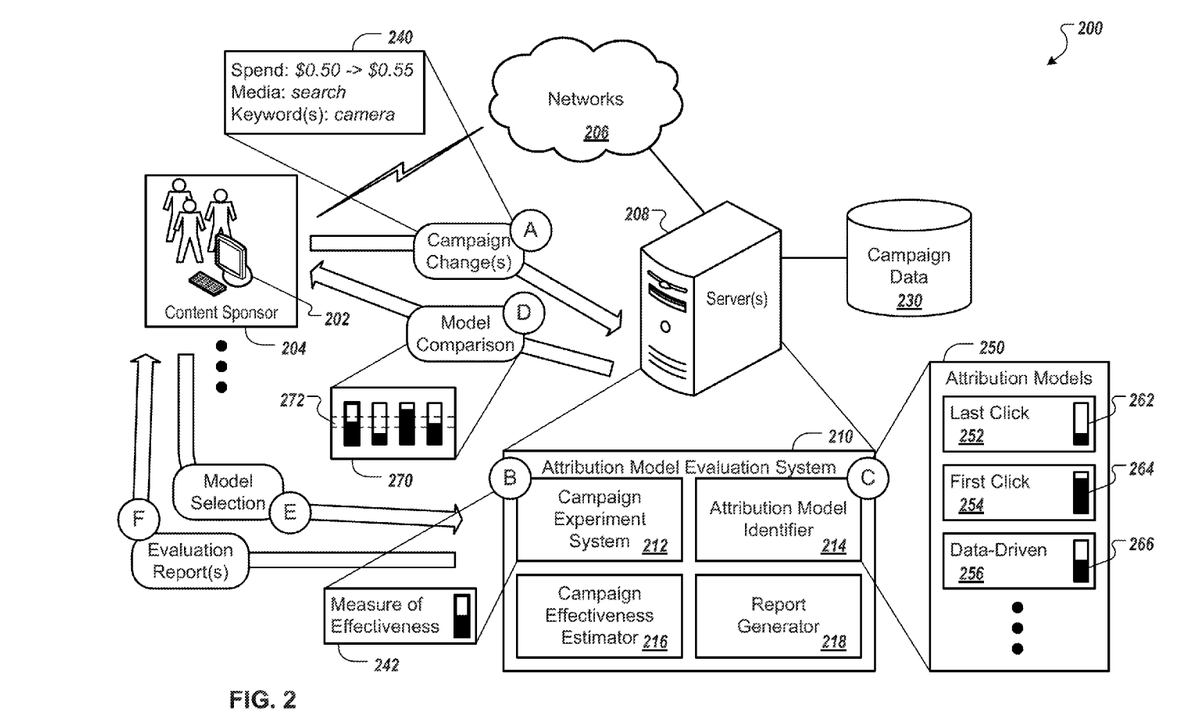
FIG. 2 is a diagram of an example system for evaluating attribution models.

FIG. 2 is a diagram of an example system for evaluating attribution models. FIG. 2 also illustrates an example flow of data within the system 200 during stages (A) to (F), wherein the states (A) to (F) may occur in the illustrated sequence, or they may occur in a sequence that is different than in the illustrated sequence. For example, two or more of the stages (A) to (F) may occur concurrently or in a different order.

The system 200 can include one or more client devices 202 (each operated by a corresponding content sponsor 204) that communicate over one or more networks 206 with one or more computing servers 208. The networks 206 may include a wireless cellular network, a wireless local area network (WLAN) or WiFi network, a Third Generation (3G) or Fourth Generation (4G) mobile telecommunications network, an intranet, the Internet, or any other suitable network or any appropriate combination thereof.

The client device(s) 202 may be any suitable type of computing device (e.g., mobile phone, smartphone, personal digital assistant, tablet computer, laptop or desktop computer, or other stationary or portable device) that includes one or more processors and computer readable media. Among other components, for example, the client device(s) 202 includes one or more processors, computer readable media that store software applications, input device(s) (e.g., touch screens, keyboards, computer mice, motion sensors, microphones, etc.), output device(s) (e.g., display screens, speakers, etc.), and communications interfaces.

The computing server(s) 208 may be configured to execute application code associated with a variety of software components (e.g., modules, objects, libraries, or services), including computer instructions to perform some or all of the method steps described below. In some implementations, the computing server(s) 208 may include one or more components of an attribution model evaluation system 210.

The attribution model evaluation system 210 can identify an attribution model for use in determining an estimate of campaign effectiveness, identify an experiment that reflects implementation of a campaign change to identify a measure of campaign effectiveness, evaluate the estimate of effectiveness as compared to the identified measure of effectiveness, and determine whether the attribution model is an effective measure of the campaign change. In the present example, the attribution model evaluation system 210 includes a campaign experiment system 212 (e.g., similar to the campaign experiment system 109, shown in FIG. 1), an attribution model identifier 214, a campaign effectiveness estimator 216, and a report generator 218. Two or more of the components 212, 214, 216, and 218 may be implemented on the same device (e.g., same computing device), or on different devices, such as devices included in a server farm or a peer-to-peer network.

The attribution model evaluation system 210 can be in communication with one or more data stores, servers, and/or other systems. In the present example, the attribution model evaluation system 210 can communicate with a campaign data store 230, which can include databases, file systems, and other suitable mechanisms for adding, removing, and maintaining campaign data used by the system 200.

Referring to the example flow of data, during stage (A), the content sponsor 204 (e.g., an advertiser) can use the client device 202 to communicate with the attribution model evaluation system 210, and can specify one or more changes 240 to a campaign (e.g., an ongoing marketing campaign). For example, the campaign change(s) 240 may include changing (e.g., increasing or decreasing) one or more campaign spend amounts, changing (e.g., adding or removing) one or more media types of content items to be presented during the campaign, and/or changing (e.g., adding or removing) one or more search keywords to be used in the campaign. In the present example, the content sponsor 204 can increase a spend amount from fifty cents to fifty-five cents for a bid on a search advertisement, for the non-branded keyword "camera".

During stage (B), the attribution model evaluation system 210 can receive the campaign change(s) 240, and can store data related to the changes in the campaign data store 230. The attribution model evaluation system 210 can provide campaign data and the campaign change(s) 240 to the campaign experiment system 212, for example, which can use the data to perform a controlled experiment (e.g., a geographic and/or a panel-based experiment), by implementing the campaign change(s) 240 in a treatment group, and by not implementing the change(s) in a control group (or vise-versa). Upon completion of the experiment, for example, the campaign experiment system 212 can identify a measure of effectiveness 242 of the change(s), within a predetermined confidence level.

During stage (C), one or more attribution models can be identified for use in determining an estimate of the effectiveness of a campaign. For example, the attribution model evaluation system 210 can use the attribution model identifier 214 to identify one or more attribution models 250 for use in determining the estimate of the effectiveness of the campaign. In general, attribution models are correlational, and may produce different estimates of campaign effectiveness, depending on the underlying rules for the model that determine how credit is assigned to user interactions (e.g., clicks, content item views, or selections) in a sequence of interactions that lead to a conversion (e.g., a purchase of a product or service). For example, a last click model 252 attributes conversions to the last content item with which a user interacted before the conversion. As another example, a first click model 254 attributes conversions to the first content item with which a user interacted (e.g., during a browsing session or a series of sessions). As another example, a data-driven model 256 can automatically distribute credit for conversions across multiple content item interactions, based on an algorithmic analysis of a user's conversion path (i.e., the sequence of interactions leading to a conversion). Other types of attribution models which may be evaluated may include, but are not limited to, a last non-direct click model that ignores direct visits, a linear model that gives equal credit to each interaction in a conversion path, a time decay model that most heavily credits interactions that occurred nearest to the time of the conversion, and a position based model that most heavily credits interactions that occurred near the beginning and near the end of a conversion path.

The attribution model evaluation system 210 can use the campaign effectiveness estimator 216 to determine one or more estimates of effectiveness of the campaign change(s) 240, using one or more of the attribution models 250. To provide data for the attribution models 250, for example, the campaign effectiveness estimator 216 can reference the campaign data store 230 and the activity data store 127 (shown in FIG. 1). Effectiveness estimates can be determined, for example, by correlating campaign spend and revenue data (e.g., from the campaign data store 230) with data indicating user interactions with one or more content items associated with a campaign (e.g., from the activity data store 127) during a predetermined time period (e.g., a day, a week, or a month). In the present example, the last click model 252 is associated with a relatively low estimate of effectiveness 262, the first click model 254 is associated with a relatively high estimate of effectiveness 264, and the data-driven model 256 is associated with an intermediate estimate of effectiveness 266.

During stage (D), comparison information can be provided to the client device 202 of the content sponsor 204, comparing an experimental measure of campaign effectiveness with one or more correlational estimates of campaign effectiveness determined by one or more attribution models. For example, the attribution model evaluation system 210 can use the report generator 218 to provide model comparison information 270 that compares the measure of effectiveness 242 of the campaign change(s) 240 with each of the estimates of effectiveness 262, 264, and 266 determined by the respective attribution models 252, 254, and 256. In the present example, the attribution model evaluation system 210 can evaluate each of the estimates of effectiveness 262, 264, and 266 as compared to the measure of effectiveness 242, and can determine that the data-driven attribution model 256 is an effective measure of the campaign change(s) 240, as the estimate of effectiveness 256 determined by the model is closest to the measure of effectiveness 242.

During stage (E), the content sponsor 204 can use the client device 204 to review the model comparison information 270 and to select an attribution model to be used in the campaign. In general, last click attribution models may underestimate the effectiveness of non-branded paid search keywords (e.g., "camera"), and first click attribution may overestimate their effectiveness. In the present example, upon reviewing the model comparison information 270, the content sponsor 204 may observe that the estimate of effectiveness 262 generated by the last click attribution model 252 is substantially lower than the measure of effectiveness 242 determined by the campaign experiment, and that the estimate of effectiveness 264 generated by the first click attribution model 254 is substantially higher. The estimate of effectiveness 266 generated by the data-driven attribution model 256, however, may be substantially similar to the measure of effectiveness 242 (e.g., within a confidence band 272), and may thus be a suitable proxy for the measure of effectiveness 242 for evaluating the effectiveness of the campaign, and/or for evaluating changes that are similar to (e.g., involving a similar change in spend, media type, etc.) the campaign change(s) 240. Upon receiving an attribution model selection (e.g., a selection of the data-driven attribution model 256) from the content sponsor 204, for example, the attribution model evaluation system 210 can store data corresponding to the selection in the campaign data store 230.

During stage (F), one or more campaign evaluation reports can be provided to the campaign sponsor 204. For example, the attribution model evaluation system 210 can identify the attribution model selected by the campaign sponsor 204, e.g., the data-driven attribution model, and can use the selected model and the report generator 218 when generating effectiveness reports for the sponsor's campaign. As another example, when providing the campaign sponsor 204 with an interface for changing a campaign (e.g., changing a campaign spending amount, changing a content item or changing a content type), effectiveness estimates using the selected model can be provided. As another example, a campaign effectiveness estimate from a selected attribution model may be used as a configuration parameter for automated or semi-automated programmatic spending changes (e.g., bidding) for a campaign.

In general, different attribution models may be suitable for estimating the effectiveness of different types of campaigns and/or different types of campaign changes. For example, the effectiveness of a particular content type included in a campaign may be accurately reflected by some attribution models, but not by others. By identifying an attribution model that estimates an effectiveness that most accurately reflects a measured effectiveness of a particular type of campaign change (e.g., an inclusion of a particular type of content item or a change in spending for a particular type of content item) a campaign sponsor may be assured that the attribution model is a suitable proxy for an experiment, and may use the attribution model (a scalable tool) for providing guidance regarding future campaign changes.

Figure 3:
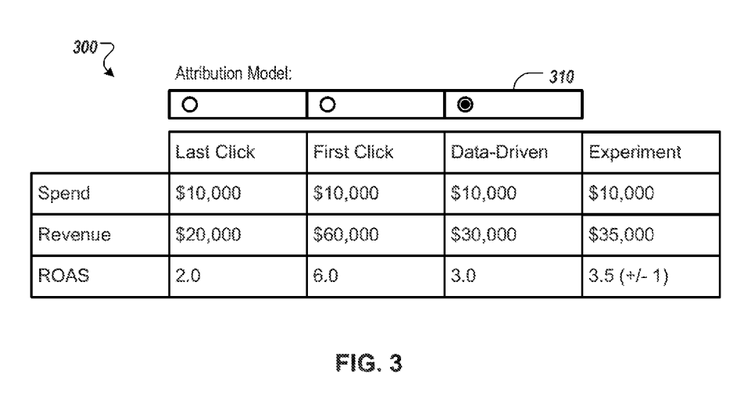
FIG. 3 is an example of a table that illustrates an evaluation of correlational estimates of effectiveness produced by attribution models as compared to a causal measurement produced by an experiment for a campaign.

FIG. 3 is an example of a table 300 that illustrates an evaluation of correlational estimates of effectiveness produced by attribution models as compared to a causal measurement produced by an experiment for a campaign. For example, the table 300 can be included in the model comparison information 270 (shown in FIG. 2) provided by the attribution model evaluation system 210 to the content sponsor 204.

The table 300, for example, can include data related to spending, revenue, and effectiveness (e.g., return on ad spending, or ROAS) for a campaign, as determined by various attribution models (e.g., last click, first click, or data-driven), and as determined by an experiment. In the present example, an ongoing campaign may be changed to include a new type of content item (e.g., a display advertisement), with a spend amount of $10,000 for having the content item presented to users during the campaign. As the type of attribution model influences the way actions of interest (e.g., purchases) are attributed to content items, for example, the determined revenue of each attribution model may vary. In the present example, a last click model estimates that the new content item contributes $20,000 of revenue to the campaign, a first click model estimates that the content item contributes $60,000 of revenue, and a data-driven model estimates that the content item contributes $30,000 of revenue. The spend and revenue values can be used to determine an estimated ROAS for each of the attribution models, for example, by dividing the revenue associated with attributed actions of interest by the cost of marketing efforts (i.e., the spend) that lead to the attributed actions. In the present example, the last click model estimates a ROAS of "2.0", the first click model estimates a ROAS of "6.0", and the data-driven model estimates a ROAS of "3.0".

A causal return on ad spending can be computed using revenue values as determined by experimental data, as opposed to revenue values attributed to marketing efforts by the application of arbitrary rules. In the present example, experimental data may indicate that a spending change (e.g., the inclusion of the new type of content item in the campaign with the spend amount of $10,000) results in the observation of an incremental change in revenue (e.g., an increase of $30,000) across a treatment group in the experiment, which was not observed across a control group. The spending change and incremental revenue values can be used to determine a causal ROAS, for example, by dividing the incremental revenue by the value of the spending change. In the present example, the causal ROAS is determined to be "3.5". In some implementations, a measure of effectiveness (e.g., a causal ROAS) determined by a controlled experiment may be determined within a predetermined confidence level (e.g., 90%, 95%, 98%, 99%, or another suitable level specified by a system user or system administrator). In the present example, a determined measurement for the causal ROAS is "3.5", with a confidence level of 95% that an actual ROAS for the spending change is within plus or minus one of the determined value.

The table 300, for example, can be provided with a control 310 for selecting an attribution model to be associated with a campaign. In the present example, a content sponsor may review ROAS values produced by each of the attribution models and causal measurements for ROAS produced by the experiment, and may determine that the ROAS of the data-driven model is closest to the causal ROAS of the experiment. Thus, in the present example, the user may select the data-driven model for future use in the campaign, and may consider the selected attribution model (e.g., the data-driven model) as a suitable tool for measuring the effectiveness for future campaign changes similar to the current change (e.g., the inclusion of a display advertisement in a campaign).

Figure 4:
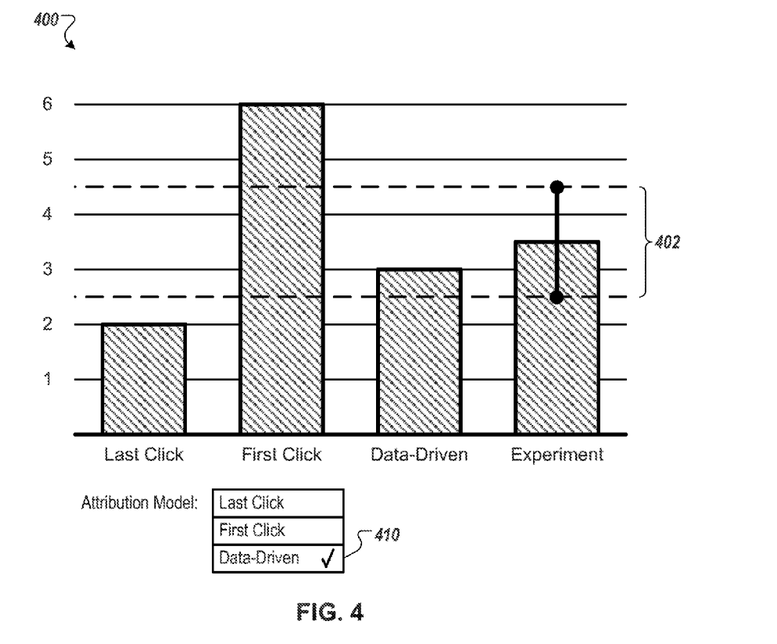
FIG. 4 is an example of a visual representation of a comparison of estimates of effectiveness and a measurement of effectiveness of a campaign.

FIG. 4 is an example of a visual representation 400 (e.g., a bar graph) of a comparison of estimates of effectiveness and a measurement of effectiveness of a campaign. For example, the visual representation 400 can be included in the model comparison information 270 (shown in FIG. 2) provided by the attribution model evaluation system 210 to the content sponsor 204.

The visual representation 400, for example, may be based on calculations used to populate the table 300 (shown in FIG. 3). The visual representation 400 includes a visual indication of a confidence band 402 corresponding to a range of values around a point measurement of effectiveness determined by an experiment, within a particular confidence level. In the present example, a determined point measurement of effectiveness (e.g., a causal ROAS) determined by the experiment is "3.5", with a confidence level of 95% that the actual effectiveness is within the confidence band 402 (e.g., between "2.5" and "4.5").

Upon reviewing the visual representation 400, for example, a content sponsor may determine that a data-driven attribution model produces an effectiveness estimate within the band 402, whereas a last-click attribution model and a first click attribution model both produce effective estimates outside of the band 402. Similar to the table 300, for example, the visual representation 400 can be provided with a control 410 for selecting an attribution model to be associated with a campaign. In the present example, the user may select the data-driven model for future use in the campaign, and may consider the data-driven model as a suitable tool to measure the effectiveness for future campaign changes similar to the current change (e.g., the inclusion of a display advertisement in a campaign).

Figure 5:
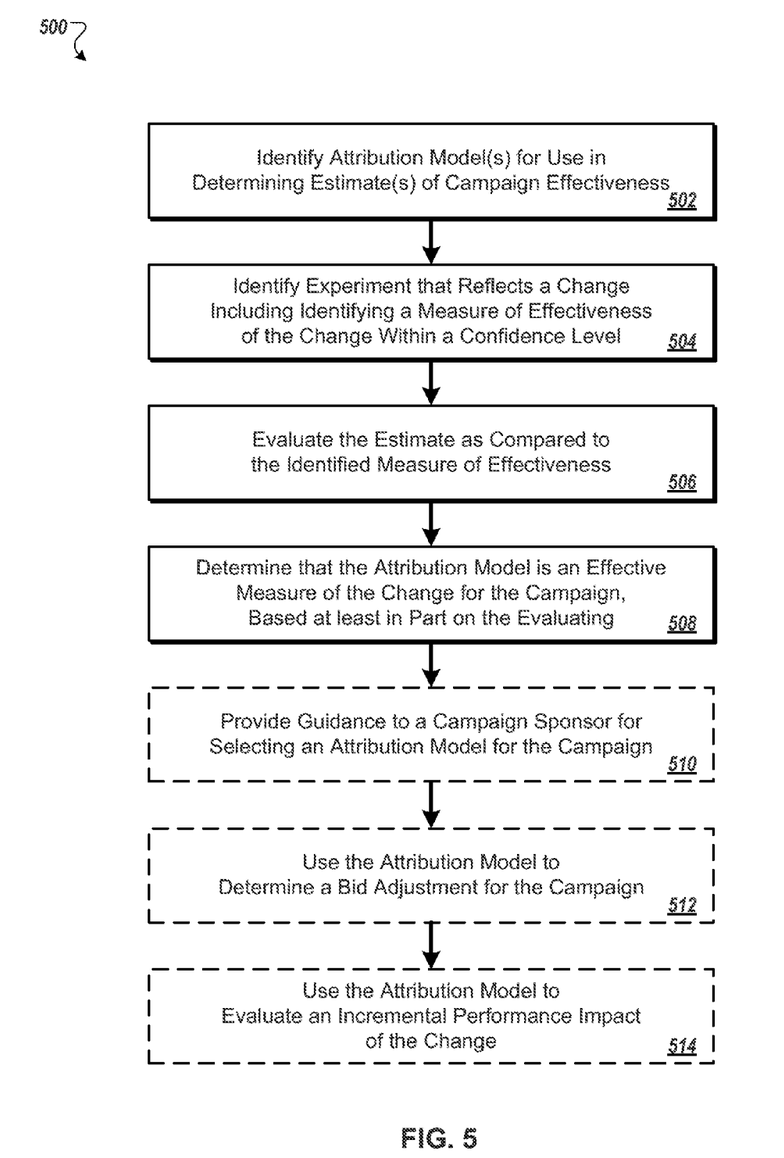
FIG. 5 is a flow chart illustrating an example process for evaluating attribution models.

FIG. 5 is a flow chart illustrating an example process 500 for evaluating attribution models. The process 500 can be performed, for example, by the content management system 110 (shown in FIG. 1) and/or the attribution model evaluation system 210 (shown in FIG. 2) described above.

An attribution model is identified (502) for use in determining an estimate of an effectiveness of a campaign. For example, the attribution model evaluation system 210 can use the attribution model identifier 214 to identify one or more attribution models 250 for determining the effectiveness of a new or ongoing marketing campaign. The campaign effectiveness estimator 216, for example, can refer to data stored by the campaign data store 230 and by the activity data store 127 (shown in FIG. 1), and can analyze the data based on rules of the identified attribution model to calculate an effectiveness estimate for the campaign. Attribution models identified by the system 210, for example, may include first click, last click, data-driven, last non-direct click, linear, time decay, position based, or other attribution models.

In some implementations, the campaign can be associated with an advertisement. For example, a marketing campaign can include one or more advertisements and parameters (e.g., time, location, bid amount, etc.) for presenting the advertisements to content consumers. Advertisements, for example, may be based on various media types, such as display, search, social, mobile, and/or video, and other media types. Various sub-types may exist for the media types, for example, branded or non-branded keywords may be specified for search advertisements.

An experiment is identified (504) which includes experiment data that reflects an implementation of a change in an experiment environment. For example, the campaign experiment system 212 (e.g., similar to the campaign experiment system 109, shown in FIG. 1) can identify or perform an experiment that reflects an implementation of the campaign change(s) 240. A measure of effectiveness of the change can be identified within a predetermined confidence level. For example, the campaign experiment system 212 can determine a measure of effectiveness 242 of the change(s) 240, within a confidence level of 95%. In general, a confidence level of 95% may be considered as a standard, however, higher or lower confidence levels may be used. For example, a confidence level may be specified by the content sponsor 204 or by an administrator of the attribution model evaluation system 210.

In some implementations, the experiment may be a geographic experiment. The geographic experiment can include a control group in one geographic region that does not present content from the campaign, as compared to other geographic areas where content from the campaign is presented. Referring to FIG. 1, for example, the campaign experiment system 109 can reference the geographic area data 122 to identify one or more suitable geographic areas for implementing the campaign change(s) 240, and one or more geographic areas (e.g., control areas) for withholding the changes.

In some implementations, the change can be a change of spend associated with a campaign. For example, the campaign change(s) 240 may include increasing a spend amount (e.g., a bid amount) from fifty cents to fifty-five cents for having a search advertisement presented to a content consumer in response to receiving the non-branded keyword "camera". As another example, the change of spend may be a reduction in spending for a content item associated with a campaign. As another example, the change of spend may be a spending redistribution which includes a reduction in spending for one or more content items, accompanied by a corresponding increase in spending for one or more other content items.

In some implementations, the change can be a change in media type or mix of media types in a campaign. For example, a campaign may include a single content item, multiple content items of a similar type, or multiple content items of different types. The change, for example, may include an addition of a new type of content item to the campaign, and/or a removal of an existing type of content item. In general, different types of content items may have a synergistic effect on campaign effectiveness which may effectively be measured by an experiment.

In some implementations, the predetermined confidence level may be associated with a band. For example, the predetermined confidence level of the measure of effectiveness 242 can be associated with a confidence band 272, which corresponds to a range of values around the measurement. In the present example, a 95% confidence level exists that the actual effectiveness of the campaign change(s) 240 is within the band 272. By specifying a higher confidence level, for example, the confidence band 272 may be decreased, whereas by specifying a lower confidence level, the band may be increased.

An estimate of campaign effectiveness is evaluated (506) as compared to an identified measure of effectiveness of an experiment. For example, the attribution model evaluation system 210 can automatically evaluate campaign effectiveness estimates for one or more attribution models 250 as compared to the measure of effectiveness 242. As another example, model comparison information 270 can be provided to the content sponsor 204 for evaluation. In some implementations, evaluating the estimate may include comparing an estimate of effectiveness for each of multiple identified attribution models, to the identified measure of effectiveness of the experiment. For example, estimates of effectiveness 262, 264, and 266, for each of the respective attribution models 252, 254, and 256, can each be compared to the measure of effectiveness 242.

An attribution model is determined (508) as an effective measure of a change for a campaign, based at least in part on the evaluating. For example, the attribution model evaluation system 210 and/or the campaign sponsor 204 can select one of the attribution models 250 as an effective measure of the campaign change(s) 240, based on the evaluation. In some implementations, determining that the attribution model is an effective measure of the change may include determining that the attribution model indicates an estimate of effectiveness that is closest to the measure of effectiveness of the experiment, relative to estimates of effectiveness of one or more other attribution models. In the present example, the estimate of effectiveness 266 produced by the data-driven model 256 is closest to the measure of effectiveness 242 determined by the experiment, and is within the confidence band 272. Thus, in the present example, the data-driven model 256 may be identified as a suitable mechanism for evaluating the campaign, and/or for evaluating changes to the campaign (or other campaigns) that are similar to the campaign change(s) 240.

Guidance may optionally be provided (510) to a campaign sponsor for selecting an attribution model from among multiple attribution models for the campaign. The attribution model can be provided as a suggestion to the content sponsor associated with the campaign. For example, the model comparison information 270 can be provided to the campaign sponsor 204, and the campaign sponsor can review the information and can select one of the attribution models (e.g., the data-driven model 256) based on the information. The suggestion may be a suggestion that the attribution model be used for a campaign, or for a portion of the campaign (e.g., a portion that includes spend for a particular content item type). As another example, the attribution model evaluation system 210 and/or the content sponsor 204 can use the model comparison information 270 to generate a customized hybrid model that includes rules from one or more of the attribution models 250.

In some implementations, a change may be suggested to a previously selected attribution model used for the campaign. For example, the content sponsor 204 may use an attribution model that produces an effectiveness estimate that is not close to the measure of effectiveness 242, or falls outside of the confidence band 272. In such an occurrence, the content sponsor 204 may be provided with an opportunity to switch from one attribution model to another, or to revise a customized hybrid model to more accurately estimate the effect of future campaign changes.

In some implementations, an attribution model may be used to generate one or more reports on an effectiveness of the campaign. Referring to FIGS. 3 and 4, for example, effectiveness reports may include features such as the table 300 and/or the visual representation 400. As another example, a report may include the name of an attribution model that indicates an estimate of effectiveness that is closest to the measure of effectiveness of the experiment, without the model comparison information 270.

An attribution model may optionally be used (512) to determine a bid adjustment for the campaign. For example, an attribution model automatically selected by the attribution model evaluation system 210 or manually selected by the content sponsor 204 can be used to provide one or more configuration parameters (e.g., effectiveness estimates, cost per action values or return on ad spend values) which may be used to influence automatic or manual spending changes for a campaign. A bid adjustment, for example, may be at a campaign level, or may be at a keyword level within the campaign.

In some implementations, one or more different bids may be suggested to be associated with the campaign, based on the change and the effectiveness indicated by the attribution model. For example, if a selected attribution model determines that the effectiveness of a campaign change (e.g., a positive spend change for a particular type of content item) is above a threshold value of effectiveness (e.g., a ROAS of 3.0, 4.0, 5.0, or another suitable value specified by a content sponsor or system administrator), the attribution model evaluation system 210 can automatically increase or suggest an increase to a bid for presenting a content item associated with the change. As another example, the selected attribution model can be used to calculate an effectiveness value (e.g., a target effectiveness value) that can be used as a parameter for an automated bid strategy implemented by the content management system 110.

An incremental performance impact of the change may optionally be evaluated (514), using the attribution model. Referring to FIG. 3, for example, experimental data may indicate that an incremental change to a campaign (e.g., a spending increase of $10,000) results in the observation of an incremental change in revenue (e.g., an increase of $30,000). In the present example, as the data-driven model is determined to be an effective measure of the campaign change, the revenue estimate determined by the model can be used as a proxy for the change in revenue measured by the experiment. In some implementations, an evaluation of the attribution model may be presented to a content sponsor associated with the campaign. For example, reports including information such as the table 300 and/or the visual representation 400 (shown in FIG. 4) can periodically be provided to the campaign sponsor 204, and/or can be provided on request.

Figure 6:
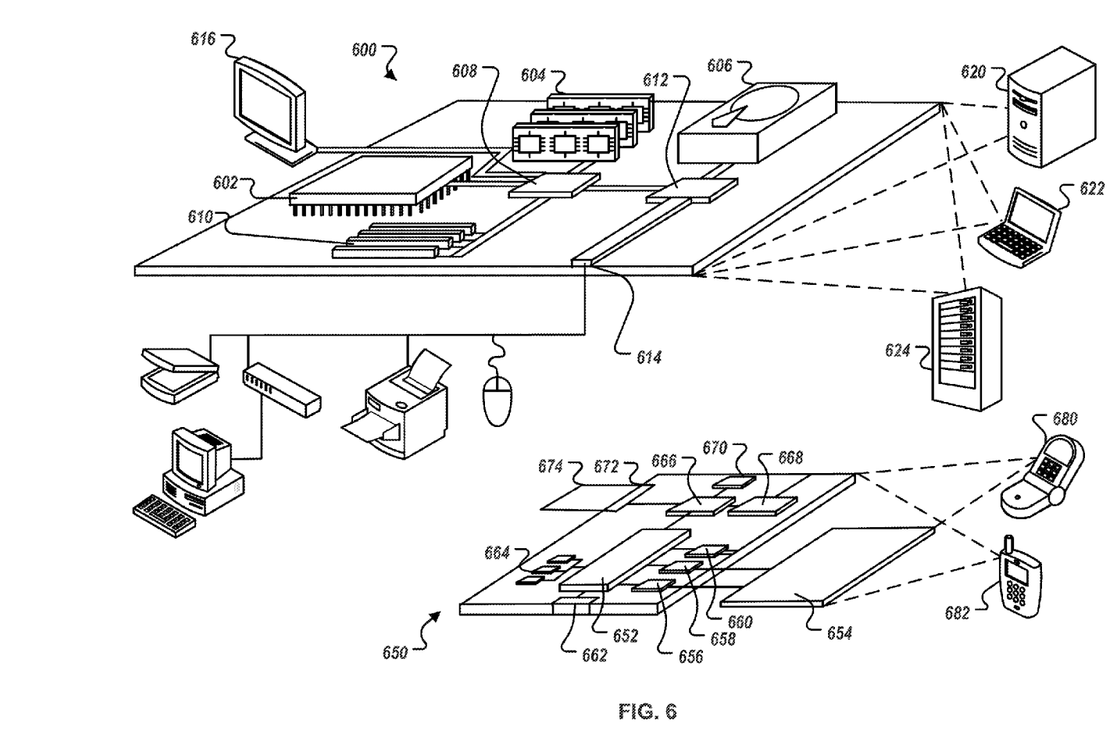
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 may process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth™, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 may execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 may be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used here, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
conducting a campaign experiment that reflects implementation of a campaign change in an experiment environment to generate experimental results that reflect a causal measurement of value of a campaign, wherein the campaign change includes a current change to one or more campaign parameters for providing content items over a computer network for presentation by user computing devices;
determining, by one or more computing servers, a measure of effectiveness of the campaign change to within a predetermined confidence level, based at least in part on analyzing the experimental results;
determining, by the one or more computing servers, an estimate of effectiveness of the campaign change, wherein determining the estimate of effectiveness comprises referencing campaign data related to the campaign change, referencing interaction data that indicates user interactions with one or more of the content items, correlating the campaign data with the interaction data over a predetermined time period, and applying rules of an identified attribution model that assigns credit to user interactions with one or more of the content items that lead to user conversions;
comparing, by the one or more computing servers, the determined estimate of effectiveness of the campaign change to the determined measure of effectiveness of the campaign change;
determining, based on the comparison, that the identified attribution model provides an estimate of the measure of effectiveness that is within a predetermined range of the measure of effectiveness of the campaign change;
for one or more subsequent campaign changes that include a change to the one or more campaign parameters that matches the current change to the one or more campaign parameters, determining a subsequent estimate of effectiveness of the subsequent campaign change, based at least in part on applying the identified attribution model in lieu of conducting another campaign experiment to determine the subsequent estimate of effectiveness of the subsequent campaign change; and
using subsequent determined estimates of effectiveness of the subsequent campaign changes obtained from application of the identified attribution model as a proxy for measures of effectiveness in lieu of conducting another campaign experiment to determine the measure of effectiveness.

2. The method of claim 1, wherein the campaign change is a change of spend associated with the campaign.

3. The method of claim 1, wherein the campaign change is a change in media type or mix of media types in the campaign.

4. The method of claim 3, wherein the campaign is associated with an advertisement and the media types are one or more of display, search, or video.

5. The method of claim 1, further comprising providing a user interface to a campaign sponsor, the user interface including a control that enables selection of a particular attribution model from among a plurality of attribution models for the campaign including providing the particular attribution model as a suggestion to the content sponsor associated with the campaign, wherein the user interface includes a visual indication of a confidence band corresponding to a range of values around a point measure of effectiveness of the campaign change, and for each of the plurality of attribution models, a visual representation of the estimate of effectiveness of the campaign change relative to the confidence band.

6. The method of claim 1, further comprising providing a user interface to a campaign sponsor, wherein the user interface visually presents a suggestion for a model change from a previously selected attribution model used for the campaign to a suggested attribution model including providing the suggested attribution model as the suggestion when an estimate of effectiveness of a campaign change based on an application of the previously selected attribution model is an unacceptable estimate of a measure of effectiveness of the campaign change.

7. The method of claim 1, further comprising identifying a plurality of attribution models, wherein comparing the determined estimate of effectiveness of the campaign change to the determined measure of effectiveness of the campaign change includes comparing a determined estimate of effectiveness of the campaign change for each of the identified plurality of attribution models to the determined measure of effectiveness of the campaign change, and wherein determining that the identified attribution model provides an estimate of the measure of effectiveness includes determining the identified attribution model from among the plurality of attribution models as an attribution model that indicates an estimate of the measure of effectiveness that is closest to the determined measure of effectiveness of the campaign change.

8. The method of claim 1, further comprising using the identified attribution model to determine a bid adjustment for the campaign.

9. The method of claim 1, further comprising suggesting one or more different bids to be associated with the campaign based on the campaign change and the estimate of effectiveness of the campaign change indicated by the identified attribution model.

10. The method of claim 1, further comprising using the identified attribution model to generate reports on an estimated effectiveness of the campaign.

11. The method of claim 1, wherein the campaign experiment is a geographic campaign experiment that uses a control group in one geographic region that does not present content from the campaign as compared to other geographic areas where content from the campaign is presented.

12. The method of claim 1, further comprising evaluating an incremental performance impact of the campaign change using the identified attribution model.

13. The method of claim 12, further comprising presenting an evaluation of the identified attribution model to a content sponsor associated with the campaign.

14. The method of claim 1, wherein the identified attribution model is selected from the group comprising first click, last click, and data-driven.

15. The method of claim 1, wherein the predetermined confidence level is associated with a band, and the estimate of effectiveness of the campaign change determined based on the attribution model is within the band.

16. A computer program product embodied in a non-transitive computer-readable medium including instructions, that when executed, cause one or more processors to perform operations comprising:
conducting a campaign experiment that reflects implementation of a campaign change in an experiment environment to generate experimental results that reflect a causal measurement of value of a campaign, wherein the campaign change includes a current change to one or more campaign parameters for providing content items over a computer network for presentation by user computing devices;
determining, by one or more computing servers, a measure of effectiveness of the campaign change to within a predetermined confidence level, based at least in part on analyzing the experimental results;
determining, by the one or more computing servers, an estimate of effectiveness of the campaign change, wherein determining the estimate of effectiveness comprises referencing campaign data related to the campaign change, referencing interaction data that indicates user interactions with one or more of the content items, correlating the campaign data with the interaction data over a predetermined time period, and applying rules of an identified attribution model that assigns credit to user interactions with one or more of the content items that lead to user conversions;
comparing, by the one or more computing servers, the determined estimate of effectiveness of the campaign change to the determined measure of effectiveness of the campaign change;
determining, based on the comparison, that the identified attribution model provides an estimate of the measure of effectiveness that is within a predetermined range of the measure of effectiveness of the campaign change;
for one or more subsequent campaign changes that include a change to the one or more campaign parameters that matches the current change to the one or more campaign parameters, determining a subsequent estimate of effectiveness of the subsequent campaign change, based at least in part on applying the identified attribution model in lieu of conducting another campaign experiment to determine the subsequent estimate of effectiveness of the subsequent campaign change; and
using subsequent determined estimates of effectiveness of the subsequent campaign changes obtained from application of the identified attribution model as a proxy for measures of effectiveness in lieu of conducting another campaign experiment to determine the measure of effectiveness.

17. The computer program product of claim 16, wherein the operations further comprise identifying a plurality of attribution models, wherein comparing the determined estimate of effectiveness of the campaign change to the determined measure of effectiveness of the campaign change includes comparing a determined estimate of effectiveness of the campaign change for each of the identified plurality of attribution models to the determined measure of effectiveness of the campaign change, and wherein determining that the identified attribution model provides an estimate of the measure of effectiveness includes determining the identified attribution model from among the plurality of attribution models as an attribution model that indicates an estimate of the measure of effectiveness that is closest to the determined measure of effectiveness of the campaign change.

18. A system comprising:
one or more processors; and
one or more non-transitory memory elements including instructions that, when executed, cause the one or more processors to perform operations comprising:
conducting a campaign experiment that reflects implementation of a campaign change in an experiment environment to generate experimental results that reflect a causal measurement of value of a campaign, wherein the campaign change includes a current change to one or more campaign parameters for providing content items over a computer network for presentation by user computing devices;
determining, by one or more computing servers, a measure of effectiveness of the campaign change to within a predetermined confidence level, based at least in part on analyzing the experimental results;
determining, by the one or more computing servers, an estimate of effectiveness of the campaign change, wherein determining the estimate of effectiveness comprises referencing campaign data related to the campaign change, referencing interaction data that indicates user interactions with one or more of the content items, correlating the campaign data with the interaction data over a predetermined time period, and applying rules of an identified attribution model that assigns credit to user interactions with one or more of the content items that lead to user conversions;
comparing, by the one or more computing servers, the determined estimate of effectiveness of the campaign change to the determined measure of effectiveness of the campaign change;
determining, based on the comparison, that the identified attribution model provides an estimate of the measure of effectiveness that is within a predetermined range of the measure of effectiveness of the campaign change;
for one or more subsequent campaign changes that include a change to the one or more campaign parameters that matches the current change to the one or more campaign parameters, determining a subsequent estimate of effectiveness of the subsequent campaign change, based at least in part on applying the identified attribution model in lieu of conducting another campaign experiment to determine the subsequent estimate of effectiveness of the subsequent campaign change; and
using subsequent determined estimates of effectiveness of the subsequent campaign changes obtained from application of the identified attribution model as a proxy for measures of effectiveness in lieu of conducting another campaign experiment to determine the measure of effectiveness.

19. The system of claim 18, wherein the operations further comprise identifying a plurality of attribution models, wherein comparing the determined estimate of effectiveness of the campaign change to the determined measure of effectiveness of the campaign change includes comparing a determined estimate of effectiveness of the campaign change for each of the identified plurality of attribution models to the determined measure of effectiveness of the campaign change, and wherein determining that the identified attribution model provides an estimate of the measure of effectiveness includes determining the identified attribution model from among the plurality of attribution models as an attribution model that indicates an estimate of the measure of effectiveness that is closest to the determined measure of effectiveness of the campaign change.

20. The system of claim 18, further comprising a user interface generator configured for providing a user interface to a campaign sponsor, the user interface including a control that enables selection of a particular attribution model from among a plurality of attribution models for the campaign including providing the particular attribution model as a suggestion to the content sponsor associated with the campaign, wherein the user interface includes a visual indication of a confidence band corresponding to a range of values around a point measure of effectiveness of the campaign change, and for each of the plurality of attribution models, a visual representation of the estimate of effectiveness of the campaign change relative to the confidence band.

\* \* \* \* \*